(12) United States Patent
Degen

(10) Patent No.: US 11,899,422 B2
(45) Date of Patent: Feb. 13, 2024

(54) POSITIONING-, DRILLING-, AND JOINING METHODS FOR A MACHINE TOOL DEVICE

(71) Applicant: Airbus Operations GmbH, Hamburg (DE)

(72) Inventor: Christopher Degen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/550,823

(22) Filed: Dec. 14, 2021

(65) Prior Publication Data

US 2022/0197241 A1 Jun. 23, 2022

(30) Foreign Application Priority Data

Dec. 17, 2020 (EP) ..................................... 20215056

(51) Int. Cl.
*G05B 19/402* (2006.01)
*B23B 35/00* (2006.01)
*B23B 49/00* (2006.01)

(52) U.S. Cl.
CPC ............ *G05B 19/402* (2013.01); *B23B 35/00* (2013.01); *B23B 49/00* (2013.01); *G05B 2219/42249* (2013.01); *G05B 2219/45129* (2013.01)

(58) Field of Classification Search
CPC ................ B23B 2215/04; B23B 49/00; G05B 2219/37205; B64F 5/10
See application file for complete search history.

(56) References Cited

U.S. PATENT DOCUMENTS 4,332,012 A * 5/1982 Sekine ................. G05B 19/128
209/552
4,611,380 A * 9/1986 Abe ................... G06K 7/10861
29/430

(Continued)

FOREIGN PATENT DOCUMENTS

JP 2003296679 A * 10/2003
WO WO2000045324 A2 * 12/2000

OTHER PUBLICATIONS

JP-2003296679-A machine translation (Year: 2003).*
European Search Report; priority document.

*Primary Examiner* — Michael W Hotchkiss
(74) *Attorney, Agent, or Firm* — Greer, Burns & Crain, Ltd.

(57) ABSTRACT

A drilling method is provided allowing drilling in confined spaces with less effort. Two independent data sources are used for reducing tolerances between the component to be joined to the workpiece. The component is measured at the supplier using photogrammetry or laser scanning. First geometric data of the component obtained by this measurement are put in a data storage, such as a barcode tag or database. At the manufacturer, the first geometric data are used to position the component relative to the workpiece. Subsequently, the component is measured to obtain second geometric data indicative of the positions and diameters of the component joining holes. After determining a deviation between the first and second geometric data to be smaller than a predetermined threshold, the automatic drill is positioned at the correct drilling location and joining holes are drilled into the workpiece. Finally, the component and the workpiece are joined by fasteners.

12 Claims, 4 Drawing Sheets

(56) References Cited

U.S. PATENT DOCUMENTS

| | | | | |
|---|---|---|---|---|
| 6,665,080 | B1* | 12/2003 | Haertig | G05B 19/401 356/601 |
| 7,146,291 | B2* | 12/2006 | Hough | G01B 21/04 702/155 |
| 7,725,206 | B2* | 5/2010 | Richey | G05B 19/401 700/118 |
| 7,946,486 | B2* | 5/2011 | Nakamura | G05B 19/4183 235/376 |
| 8,447,549 | B2* | 5/2013 | Doytchinov | G01B 21/047 702/81 |
| 9,558,547 | B2* | 1/2017 | Alam | G06T 7/001 |
| 10,459,434 | B2* | 10/2019 | Regnault | G05B 19/41805 |
| 2006/0043174 | A1* | 3/2006 | Banavar | G06Q 50/30 235/383 |
| 2008/0189325 | A1* | 8/2008 | Hanses | G05B 19/4183 |
| 2013/0197852 | A1* | 8/2013 | Grau | G01B 5/008 702/123 |
| 2014/0067333 | A1* | 3/2014 | Rodney | G06T 19/00 703/1 |
| 2014/0135983 | A1* | 5/2014 | Donar | G06F 15/00 700/254 |
| 2015/0012171 | A1* | 1/2015 | Richter | B64F 5/60 701/32.9 |
| 2016/0109876 | A1* | 4/2016 | Addicott | G05B 19/401 700/98 |
| 2016/0370790 | A1* | 12/2016 | Pinkston | G01B 5/008 |
| 2017/0016718 | A1* | 1/2017 | Godfrey | B23Q 17/2233 |
| 2017/0220021 | A1* | 8/2017 | Bode | G05B 19/4097 |
| 2019/0101889 | A1* | 4/2019 | Riek | G05B 19/401 |
| 2019/0143399 | A1* | 5/2019 | Kasahara | B25J 19/023 29/525.06 |
| 2019/0152621 | A1* | 5/2019 | Esteban Finck | G06F 30/17 |
| 2020/0101541 | A1 | 4/2020 | Wilson et al. | |
| 2020/0216198 | A1* | 7/2020 | Engelbart | G05B 19/4097 |
| 2020/0346349 | A1 | 11/2020 | Chung et al. | |
| 2021/0064948 | A1* | 3/2021 | Geisen | G06K 19/06037 |
| 2021/0130010 | A1* | 5/2021 | Charlton | B64F 5/10 |
| 2021/0138600 | A1* | 5/2021 | Sato | B64F 5/10 |
| 2021/0279501 | A1* | 9/2021 | Schimmel | G06V 20/00 |
| 2022/0222395 | A1* | 7/2022 | Song | G06F 30/20 |

* cited by examiner

POSITIONING-, DRILLING-, AND JOINING METHODS FOR A MACHINE TOOL DEVICE

CROSS-REFERENCES TO RELATED APPLICATIONS

This application claims the benefit of the European patent application No. 20215056.1 filed on Dec. 17, 2020, the entire disclosures of which are incorporated herein by way of reference.

FIELD OF THE INVENTION

The invention relates to methods for a machine tool device, a machine tool device and a computer program product.

BACKGROUND OF THE INVENTION

Manufacturing today, in particular in the aircraft industry, is based on intricate supply chains using different suppliers who manufacture parts according to given specifications. Usually for compatibility reasons, the parts are not completely finished but have to be finished and fitted at the assembly line of the aircraft manufacturer, for example.

In some assembly steps, structural parts, such as ribs, brackets, corner fittings and the like, need to be arranged in confined spaces or other situations in which the part is not easily accessible for work. However, the part still needs to be finished and fitted before it can be mounted in its predetermined position.

SUMMARY OF THE INVENTION

It is an object of the invention to reduce the time and/or effort required for assembly and to improve the quality of the assembly.

The invention provides a positioning method for automatically positioning a tool of a machine tool device relative to a workpiece and a component, wherein the machine tool device comprises a measuring device and a control device. The positioning method comprises the steps of:
1.1 Providing a component to be assembled which is manufactured to final dimension, including all assembly holes required for joining the component to the workpiece. Furthermore, all relevant dimensional data for each individual component is to be physically marked on the component in a machine readable form. These dimensional data are to be measured at the supplier of the component to the maximum accuracy possible.
1.2 Positioning the component relative to required position based on the geometrical information read from the component and relevant datum positions in the area in which the component is to be mounted.
1.3 Using a measurement system, which uses the information on the component and the geometrical description of the area in which the part is mounted to confirm that the part has been positioned in the required position.
1.4 The machine tool to drill any required holes is mounted in the most convenient position, which will often be on the exterior of the area to be drilled. The part to be assembled is then scanned from the position of the machine tool through the structure to be drilled.
1.5 The information from this scan is then compared to the geometrical data provided with the component. If the two independent measurements of each hole to be drilled agree to the accuracy of a pre-determined threshold, then the machine tool device will be controlled by the local data defining the position at which each drilling operation is to take place.

The information for the part to be assembled should include at least three assembly holes and their exact diameters, together with the relative positions of these holes. Additional information on the position and angle of mating surfaces within the component should also be available.

Preferably, the data storage includes a tag that is configured to be attached to the component, such as a barcode tag, a 2D-barcode tag and/or an RFID-tag. The information about drawing number and individual component number must be included within the data storage.

The measuring device should include a measuring unit that is configured to detect geometric dimensions of the component to be joined, when the component and the measuring unit are arranged on opposite sides of the structure to be drilled.

As an example, the measuring unit may use an ultrasonic measuring head, and the second geometric datum is measured by means of ultrasonic waves. It is important that this measurement system does not require any water or other medium to correctly function. Such systems are relatively new, but do exist in the market today.

Preferably, the positioning method further comprises the step of:
1.6 Removing the component, if the deviation is determined to be above a predetermined threshold.

The invention provides a machining method for machining a workpiece and/or a component using a machine tool device, the machining method comprising the steps of:
9.1 with the machine tool device, performing a preferred positioning method; and
9.2 after step 9.1, performing an operation with the tool on the workpiece and/or on the component at the predetermined working position.

The invention provides a drilling method for a machine tool device configured for automatically drilling holes into a workpiece so as to allow joining of the workpiece with a component, the drilling method comprising the steps of:
10.1 with the machine tool device, performing a preferred positioning method, wherein the tool is a drilling tool; and
10.2 Drilling a hole at the predetermined position.

The invention provides a joining method for joining a workpiece and a component, the joining method comprising:
110.1 performing a preferred drilling method; and
110.2 Inserting a fastener into the bored hole and fastening the workpiece and the component using the fastener.

The invention provides computer program for a machine tool device having a tool configured to machine the workpiece, a measuring device configured to measure the component, and a control device, wherein the computer program comprises instructions which, when the program is executed by the control device cause the machine tool device to perform any of the methods described before.

The invention provides a computer readable medium comprising the preferred computer program.

The invention provides a data carrier signal carrying the preferred computer program.

The invention provides a machine tool device configured to machine a workpiece based on a component that is arranged to be attached to the workpiece, wherein the machine tool device comprises a tool configured to machine the workpiece, a measuring device configured to measure the component, and a control device configured to control the machine tool device such that any of the preferred methods described before is performed.

Preferably, the machine tool device is an automatic drilling device and the tool is a drilling tool.

With the invention, drilling or drilling from inside confined spaces may be improved. In particular, required time and effort may be decreased. Usually, drilling of multiple material stacks (e.g., carbon-fiber reinforced plastic, CFRP, and Titanium) compromises drilling speeds for both materials. The methods and devices according to the invention help to avoid repeated drilling of holes, thereby decreasing wear and increasing tool life. Furthermore, the use of shims is simplified. The shims may be introduced between the workpiece and the component before drilling.

Furthermore, the invention avoids the use of drilling templates. As a result, smaller improvements of the overall construction may readily be implemented since time consuming reconstruction of drilling templates can be omitted.

In addition, time consuming disassembly and reassembly due to burrs, especially on brittle Titanium and the like, can be avoided.

According to the invention, no pilot or positioning holes are drilled in the workpiece. The components to be installed on the aircraft are predrilled to final diameter by the supplier. Extremely highly loaded components (in general less than 5%) are preferably drilled with the diameter 0.1 mm undersize.

Each component is automatically measured at the supplier using photogrammetry, for example. Other contactless methods such as laser scanning may also be used. Information of manufactured geometric properties such as exact diameter and position of every hole relative to each other, datum faces and interface points are added to the component in machine readable form. This may take the form of a 2-D bar code, simple barcode or database entry.

The component is then positioned at the manufacturer using the machine readable geometric data, e.g., by scanning the 2-D barcode. The component may be pre-fixed to the workpiece together with sealant and/or a shim as necessary.

While the sealant is curing, the component is scanned through the workpiece to be drilled, such as the aircraft structure. The scanning can be done by means of (waterless) ultrasonic waves or other means that allow scanning of the component through the workpiece, magnetic means, for example. The results of the scan are compared with the data delivered with the component, i.e., the barcode or database entry. If the data provided by the supplier and the data measured by the manufacturer are consistent, i.e., are within a predetermined threshold, the automatic drilling device is updated in real-time.

Subsequently, the automatic drilling system drills the holes from the outside at a convenient angle—no further work required.

With the methods and devices described herein, an accuracy of 0.1 mm may be achieved. The wear on the drilling tools may be reduced, in particular, in the case of mixed material joints (CFRP and Titanium). The overall time required for drilling can be reduced.

In addition, the use of shims may be reduced or entirely avoided thereby reducing delays for individual fitting of parts. Also, removal of burrs—and disassembly and reassembly in connection therewith—may be avoided. As a result, the assembly rate may increase.

It is also possible to create an automatic inspection and quality documentation record based on the measurements. Finally, the need for work in enclosed or confined spaces is reduced thereby improving ergonomics.

BRIEF DESCRIPTION OF THE DRAWINGS

Embodiments of the invention are described in more detail with reference to the accompanying schematic drawings.

DETAILED DESCRIPTION OF THE PREFERRED EMBODIMENTS

Figure 1:
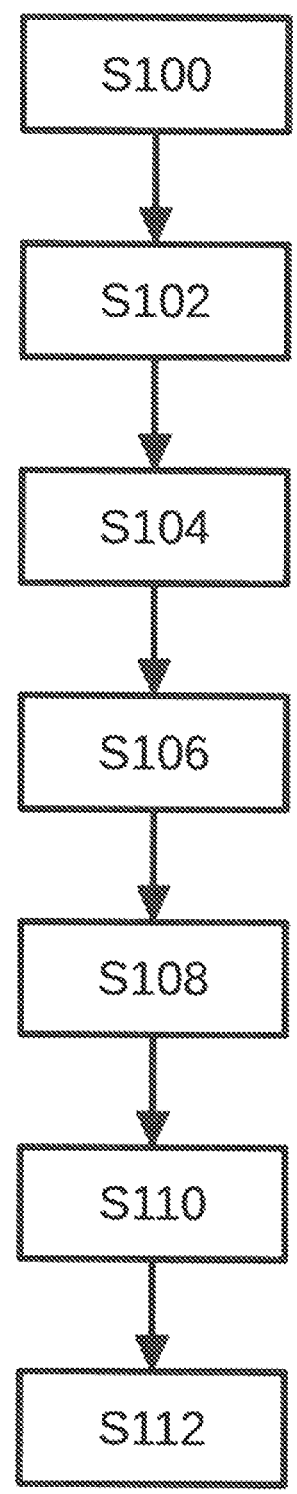
FIG. 1 illustrates an embodiment of a joining method.

Reference is made to FIG. 1 which depicts an embodiment of a joining method S100-S112. The method joins a workpiece 10 and a component 12 together. The workpiece 10 is preferably an aircraft structure to which typically multiple smaller components are attached. Examples for the workpiece 10 include (a part of) a fuselage, a wing or wing box, a tail plane or the like. Examples for the component include brackets, clips, ribs, and (corner) fittings.

In an initial step S100, also designated providing step, the component 12 is provided for further processing. The component 12 is configured to be joined to the workpiece 10. The component 12 includes a joining portion 14. The component 12—including the joining portion 14—is manufactured with final dimensions.

The joining portion 14 has a plurality of joining holes 16 for joining the joining portion 14 to the workpiece 10. It should be noted that other joining features are possible, in particular in addition to the joining holes 16. Furthermore, it is possible for the component 12 to have more than one joining portion 14.

The component 12 has associated with it at least one first geometric datum G1. The first geometric datum G1 is indicative of a manufactured geometric property of the joining portion 14.

Figure 2:
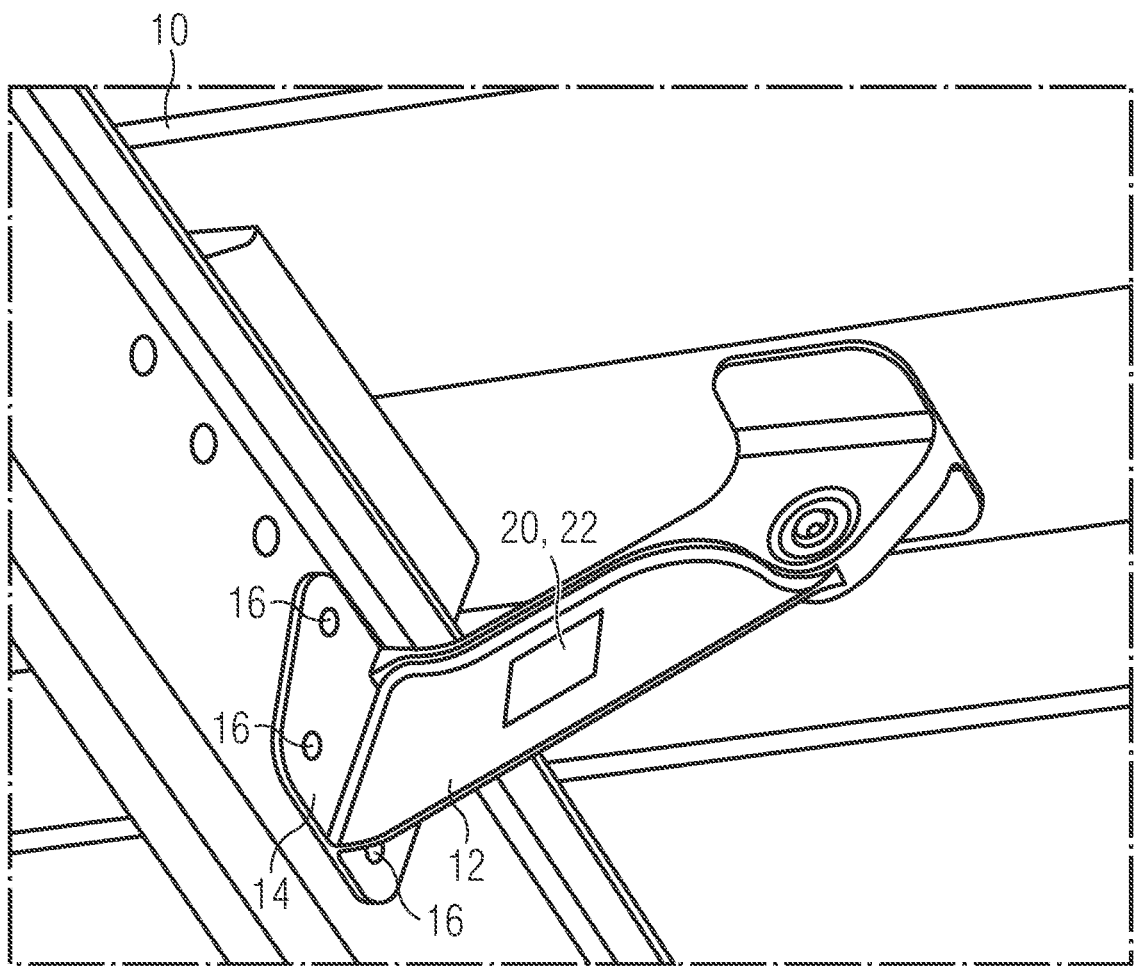
FIG. 2 illustrates an example of a typical joining situation.

For example, the joining portion 14 may include four joining holes 16 that are arranged on the corners of a square, as illustrated in more detail in FIG. 2. The first geometric data G1 include the final size joining hole diameter d of each joining hole 16. Furthermore, the first geometric data G1 include the relative positions of the joining holes 16. In other words, the first geometric data G1 are indicative of the exact hole pattern of the joining portion 14. More general, the first geometric data G1 are indicative of the exact configuration of the joining portion 14.

Each first geometric datum G1 is obtained by means of an automatic measuring process, such as photogrammetry and/or laser scanning. The first geometric data G1 are stored in a machine readable form in a data storage 20.

The data storage 20 is preferably a tag 22, that may be attached to the component 12 or is delivered together with the component 12. The tag 22 may be selected from a group including 1-D or 2-D barcode tags or RFID-tags. In another embodiment, the data storage 20 may include a database that stores the first geometric data G1 corresponding to the respective component 12.

In a positioning step S102, the component 12 is positioned in a predetermined position. During the positioning the first geometric data G1 may be used to position the component 12. The component 12 may be prefixed using a sealant 22. In addition, a shim 24 may be arranged between the workpiece 10 and the component 12. In this case, the whole stack of parts including the shim 24 can be prefixed using the sealant 22.

Figure 3:
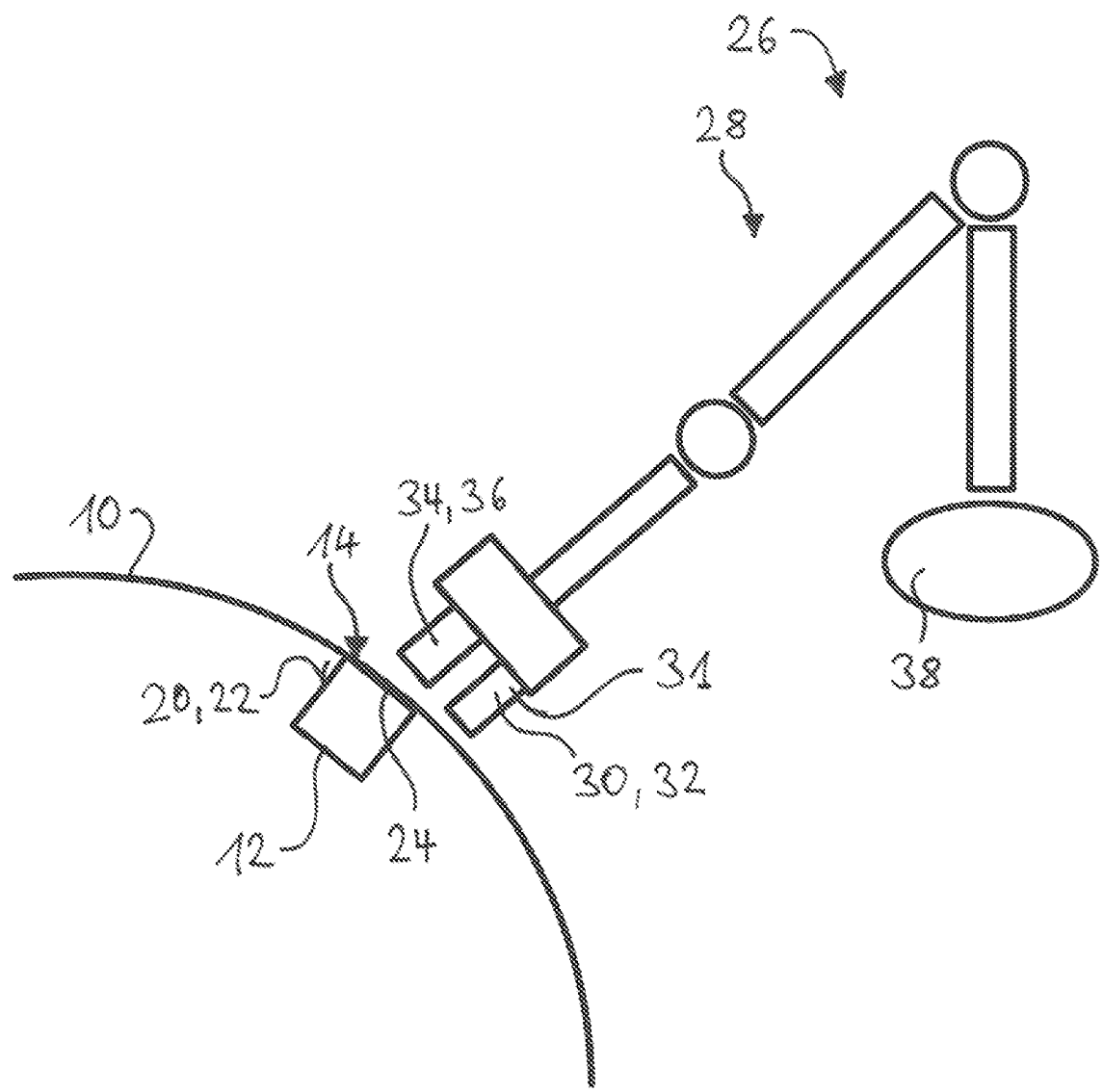
FIG. 3 depicts an embodiment of a machine tool device.

A machine tool device 26 is used for working on the workpiece 10. In this embodiment, the machine tool device 26 is an automatic drilling device 28 configured for automatically drilling holes at predetermined positions using numerical control. Usually, as depicted in FIG. 3, the component 12 and the machine tool device 26 are positioned on opposite sides of the workpiece 10.

The machine tool device 26 comprises a measuring device 30. The measuring device 30 is configured for measuring the component 12, in particular the joining portion 14. The measuring device 30 has a measuring unit 31 that is configured such that measuring can be performed through the workpiece 10. The measuring unit 31 may include an ultrasonic measuring head 32. The measuring unit 31 may also use other methods, for example a magnetic measuring head based on magnetic principles.

The machine tool device 26 further includes a tool 34. In case of the automatic drilling device 28, the tool 34 is a drilling tool 36.

The machine tool device 26 has a control device or controller 38 that is configured for controlling the operations of the machine tool device 26, among them positioning and operating the tool 34.

Figure 4:
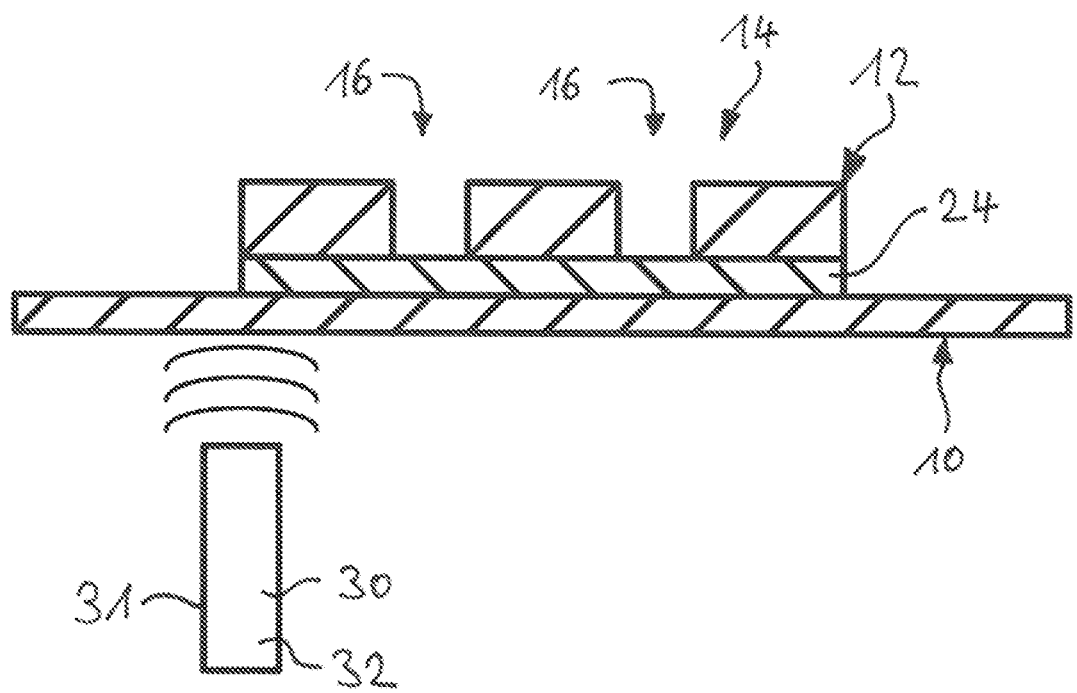
FIG. 4 depicts a cross-section of the joining situation.

In a measuring step S104, the measuring device 30 measures the relative position and joining hole diameter of every joining hole 16 of the component. For example, the measuring device 30 sends out pulses of ultrasonic waves and detects the reflection. In a manner known per se, the layered structure (FIG. 4) of the joint to be is measured. As a result, the positioning and joining hole diameter of each joining hole 16 is determined as second geometric data G2. The second geometric data G2 thus include information corresponding to the first geometric data G1. The second geometric data G2 are obtained from a source independent from the source of the first geometric data G1. The second geometric data G2 are stored in the control device 38.

In a comparing step S106, the control device 38 retrieves the first geometric data G1 from the data storage 20 and compares it to the second geometric data G2. A deviation between the first and second geometric data, G1, G2 is determined.

If the deviation is below a predetermined threshold, a positioning step S108 and an operating step S110 are performed. In the positioning step S108, the control device 38 causes the tool 34 to move to a working position given by the first and/or second geometric data G1, G2. In the operating step S110, the control device 38 causes the tool 34 to perform a tool operation.

In case of the automatic drilling device 28, the drilling tool 36 is moved to the drilling positions that correspond to the positions of the joining holes 16 and the drilling tool 36 drills through the workpiece 10 and the joining holes 16. Since a small deviation in joining hole diameter and relative position is allowed, the drilling tool 36 may also remove a small amount of the component 12.

In a fastening step S112, fasteners are inserted into the previously drilled holes. Subsequently, the component 12 is fastened to the workpiece 10 using the fasteners.

If the deviation exceeds the predetermined threshold, none of the steps S108 to S112 are performed. Instead, the component 12 is removed and rejected as out of spec.

It should be noted that all steps may be recorded by the control device 38 in order to obtain a continuous record of the manufacturing process for quality control and other documentation purposes.

The steps S100 to S106 form a positioning method for positioning a tool. The steps S100 to S110 form a general machining method in case of a machine tool device and specifically a drilling method in case of an automatic drilling device.

In order to improve manufacturing of aircraft, a drilling method is provided that allows drilling in confined spaces with less effort. The idea is to use two independent data sources for reducing the tolerances between the component to be joined to the workpiece. The component is measured at the supplier using photogrammetry or laser scanning First geometric data of the component obtained by this measurement are put in a data storage, such as a barcode tag or database. At the manufacturer, the first geometric data are used to position the component relative to the workpiece. Subsequently, the component is measured to obtain second geometric data that are indicative of the positions and diameters of the joining holes of the component. After determining a deviation between the first and second geometric data to be smaller than a predetermined threshold, the automatic drill is positioned at the correct drilling location and joining holes are drilled into the workpiece. Finally, the component and the workpiece are joined by fasteners.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 workpiece
12 component
14 joining portion
16 joining holes
20 data storage
22 tag
24 shim
26 machine tool device
28 automatic drilling device
30 measuring device
31 measuring unit
32 ultrasonic measuring head
34 tool
36 drill
38 control device/controller
G1 first geometric datum
G2 second geometric data
S100 initial step
S102 positioning step
S104 measuring step
S106 comparing step S108 positioning step
S110 operating step

The invention claimed is:

1. A positioning method for automatically positioning a tool of a machine tool device relative to a workpiece and a component, wherein the machine tool device comprises a measuring device and a controller, wherein the positioning method comprises the steps of:
   1.1 providing a component having a joining portion, wherein the joining portion is manufactured to a final dimension and is configured for joining the component to the workpiece, wherein the component has associated with it at least one first measured geometric datum indicative of a manufactured geometric property of the joining portion, wherein the first measured geometric datum is stored in machine readable form in a data storage;
   1.2 positioning the component relative to the workpiece in a predetermined position based on the first measured geometric datum;
   1.3 with the measuring device, measuring the joining portion after the component was arranged at the predetermined position to obtain at least one second measured geometric datum that corresponds to the respective first measured geometric datum stored in the data storage;
   1.4 with the controller, retrieving the first measured geometric datum from the data storage and determining a deviation between the retrieved first measured geometric datum and the second measured geometric datum; and
   1.5 with the controller, controlling the machine tool device such that the tool is moved to a predetermined working position, if the deviation is determined to be below a predetermined threshold,
   wherein the data storage is a machine readable tag attached to the component,
   the method further comprising the step of scanning the machine readable tag to retrieve the first measured geometric datum.

2. The positioning method according to claim 1, wherein the tag comprises at least one of a barcode tag, a 2D-barcode tag, and an RFID-tag.

3. The positioning method according to claim 1, further comprising the step of:
   1.6 removing the component, if the deviation is determined to be above the predetermined threshold.

4. A machining method for machining at least one of a workpiece or a component using a machine tool device, the machining method comprising the steps of:
   9.1 with the machine tool device, performing a positioning method according to claim 1; and
   9.2 after step 9.1, performing an operation with the tool on the at least one of the workpiece or the component at the predetermined working position.

5. The positioning method according to claim 1, wherein the joining portion includes at least one joining hole, and the first measured geometric datum is indicative of at least one of a manufactured joining hole position or a manufactured joining hole diameter.

6. The positioning method according to claim 5, wherein the second geometric datum includes a measured joining hole position that corresponds to at least one of a manufactured joining hole position or a measured joining hole diameter that corresponds to a manufactured joining hole diameter.

7. The positioning method according to claim 1, wherein the measuring device includes a measuring unit configured to detect geometric dimensions of the component, when the component and the measuring unit are arranged on opposite sides of the workpiece, and the second geometric datum is measured by means of the measuring unit.

8. The positioning method according to claim 7, wherein the measuring unit is configured as an ultrasonic measuring head, and the second geometric datum is measured by means of ultrasonic waves.

9. A drilling method for a machine tool device configured to automatically drill holes into a workpiece to allow joining of the workpiece with a component, the drilling method comprising the steps of:
   10.1 with the machine tool device, performing a positioning method according to claim 1, wherein the tool is a drilling tool; and
   10.2 drilling a hole at the predetermined position.

10. A joining method for joining a workpiece and a component, the joining method comprising:
   11.1 performing a drilling method according to claim 9; and
   11.2 inserting a fastener into the hole and fastening the workpiece and the component using the fastener.

11. A machine tool device configured to machine a workpiece based on a component that is arranged to be attached to the workpiece, wherein the machine tool device comprises a tool configured to machine the workpiece, a measuring device configured to measure the component, and a controller configured to control the machine tool device such that a method according to claim 1 is performed.

12. The machine tool device according to claim 11, wherein the machine tool device is an automatic drilling device and the tool is a drilling tool.

* * * * *